DANIEL BENDANN & DAVID BENDANN.
Improvement in Photographic Backgrounds.
No. 125,522. Patented April 9, 1872.
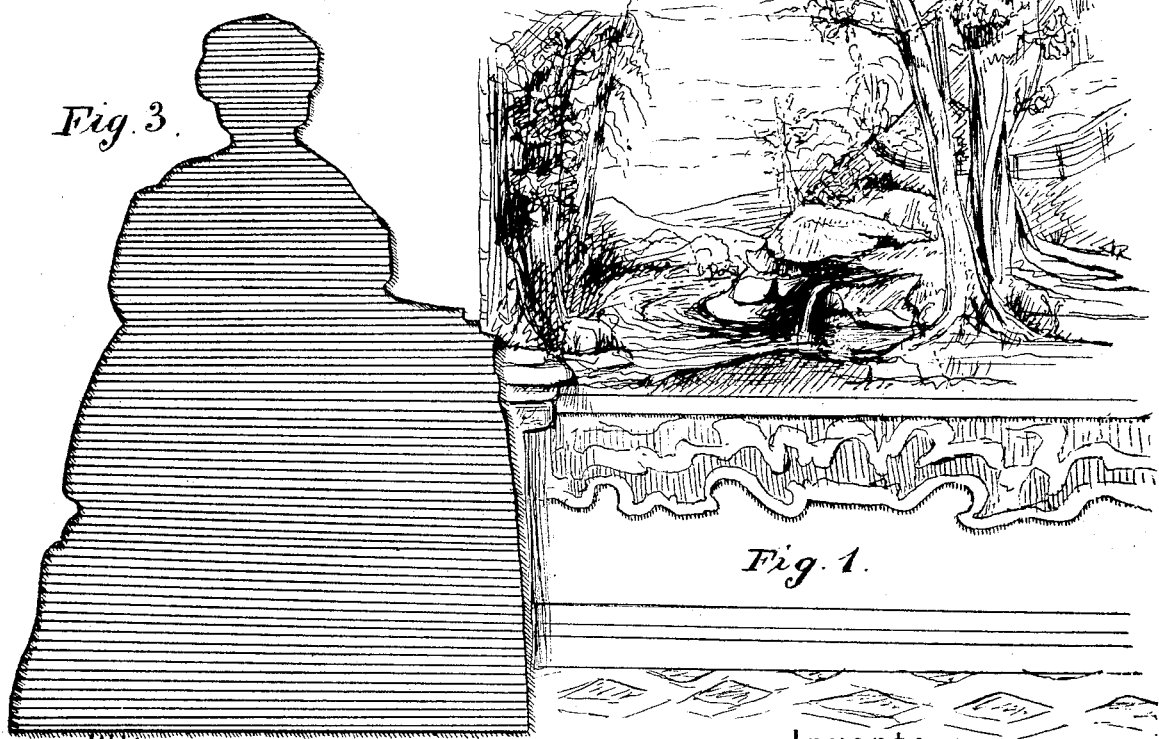
Witnesses:
Everett S Hayden
Chas Slosson
Inventors:
Daniel Bendann
David Bendann 125,522

UNITED STATES PATENT OFFICE.

DANIEL BENDANN AND DAVID BENDANN, OF BALTIMORE, MARYLAND.

IMPROVEMENT IN PHOTOGRAPHIC BACKGROUNDS.

Specification forming part of Letters Patent No. 125,522, dated April 9, 1872.

Specifications describing an improved process of preparing photographic background studies and negatives thereof, and of printing backgrounds upon photographs and photographic prints, invented by DANIEL BENDANN and DAVID BENDANN, both of the city of Baltimore, State of Maryland.

The preparation of backgrounds for photographs and photographic prints being usually attended with great expense on account of the number and size of paintings required, and the artistic skill necessary for their production, and the best results obtained being so meager, unsatisfactory, and unartistic, the obtaining of suitable backgrounds at a reduced expense, and free from the defects alluded to has been a great desideratum in photography, and this object we accomplish in the following manner:

Figure 1 is a given landscape. Fig. 2 is a plain photograph. Fig. 3 is a rough mask. Fig. 4 is a photograph with landscape printed in.

A landscape, Fig. 1, or other subject desired for the given background is delineated upon canvas or other material, in such a manner as to secure graduated lights and shades that will produce required atmospheric and scenic effects in the backgrounds of photographs, made by the process hereinafter explained, which is mainly accomplished by making the high lights lighter and the dark shades darker. The size of the picture thus delineated is immaterial, and it may be made of any dimensions to suit the convenience of the artist. A negative of this picture is then taken with the common photographic camera, and with this negative the background of the photograph is made in the manner hereinafter specified.

It is obvious that any required number of negatives may be made of the picture thus delineated, and as these negatives can be furnished at a trifling cost, obviating the necessity of procuring expensive paintings for desired backgrounds, the great commercial value of this part of our invention is apparent.

When backgrounds are desired for photographs of persons or other objects in nature, the negative of the object is made with the common photographic camera in the usual mode, and the photograph of this object is then printed in the common way with the customary dove-colored, dark gray, or other desired plain background, it not being necessary to shade off either the object delineated, or the plain background; and after the picture, Fig. 2, is printed ready for toning, the negative is removed, and the background negative is suitably adjusted over the print, Fig. 2, just made; a cloth, the hand, or a mask, Fig. 3, roughly shaped in the form of the printed object in Fig. 2, being placed over the background negative directly above the object, to prevent the rays of light falling upon the object, except at the pleasure of the artist; and the background ($b$ $b$ in Fig. 4) is then printed upon the photograph, the artist manipulating this cloth or or mask, Fig. 3, so as to harmoniously blend the background with the outlines of the object ($a$ in Fig. 4) already printed; and when the background has been printed to the desired point, the completed photograph, Fig. 4, is toned in the ordinary manner.

This process is especially valuable for printing upon gelatine or other substances for photo-lithographic purposes and for tinted or colored photographs, as much labor and great expense are saved thereby; and it is also desirable in making backgrounds for old photographs or photographs of sculpture, old paintings, engravings, and other pictures.

When a given background is required for a photograph that already has a scenic background, the old background may be painted out or otherwise stopped out, (although this is not essential,) so that it will print white, and then the desired shade can be printed in either before or after the given background is made in the manner heretofore described.

It is apparent that a desired background may in like manner be printed upon a vignetted photograph that will harmonize with the vignette. It is also obvious that with one negative of the sitter or main object photographed any number of prints may be made, all having different backgrounds, the number and variety being only limited by the number of background negatives in possession of the photographer.

The ease and celerity with which the art of printing in backgrounds by the process just described, may be acquired makes our invention especially advantageous to the public, and it will be found that the following among other objects greatly desired, but never before obtained, have been thereby secured, namely: The background is rendered entirely subordinate to the main object photographed. There are no sharp outlines between this main object (a in Fig. 4) and the background, (b b in Fig. 4,) but the whole photograph is harmonious in tone and shade.

Scenic and atmospheric effects are produced that hitherto it has been impossible to obtain, and the minutest details, even in the outlines of the main object, (a in Fig. 4,) photographed, such as floating hairs or the finest-meshed lace, are accurately preserved and faithfully delineated.

We claim as our invention—

1. The delineation, upon canvas or other material, of the desired objects in nature or of art, in such a manner as to secure graduated lights and shades that will produce required atmospheric and scenic effects in the backgrounds of photographs and photographic prints, in the manner described.

2. The printing of backgrounds in photographs and photographic prints, by the use of properly-prepared background negatives without the necessity of painting out or otherwise stopping out original backgrounds, in the manner described.

DANIEL BENDANN.
DAVID BENDANN.

Witnesses:
WM. H. McCABE,
WM. H. BAYZAND.